Patented June 10, 1941

2,244,712

UNITED STATES PATENT OFFICE 2,244,712

CONTROL OF AMBROSIA BEETLES

Lucas P. Kyrides, Webster Groves, Mo., assignor to Monsanto Chemical Company, St. Louis, Mo., a corporation of Delaware No Drawing. Application December 4, 1939, Serial No. 307,414

12 Claims. (Cl. 21—43)

The present invention relates to the control of insects and it has particular relation to the use of repellents for the control of such wood-burrowing insects as ambrosia beetles and for the control of fungi associated therewith.

Ambrosia-eating beetles, or, as they are more commonly called, ambrosia beetles, are comprised in the group of wood-boring Scolytidae of the order Coleoptera which feed not upon wood but upon a substance called "ambrosia." These ambrosia are certain fungi propagated by ambrosia beetles on the walls of their galleries in the wood. A definite symbiotic relationship between the beetles and these ambrosia fungi has been found to exist. There are several varied forms of ambrosia fungi which appear to be associated with different species of ambrosia beetles. Most of the ambrosia fungi are chromogenic organisms belonging to the group known as sap-stain organisms. The sap-stain organisms which are referred to as ambrosia fungi have been studied but not definitely identified (see C. T. Rumbold, J. Agricultural Research, 1931, vol. 43, pages 848 and 849). The methods by which these chromogenic fungi are carried may be mere mechanical carriage on the body of the insect or on mites carried by the insect or they may be carried in the intestinal tract of the insect and disseminated therefrom. The exact mechanism of carriage of chromogenic fungi has not been ascertained but it has been definitely established that where ambrosia beetles are found there also are found chromogenic fungi. Typical ambrosia beetles are Xyleborus dispar, Xyleborus pubescens, Monarthrum mali, Xyloterus retusus, Platypus compositus, Corthylus punctatissimus, Gnathotrichus materiarius and the group includes species of the genera, Xyleborus, Xyloterus, Platypus, Corthylus, Monarthrum and Gnathotrichus. More than thirty species of ambrosia beetles distributed in these six genera are known to occur in the United States. Ambrosia beetles, the ambrosia fungi and their life habits have been described by Henry G. Hubbard in the Yearbook of the U. S. Department of Agriculture, 1896, pages 421 to 430, and Bulletin No. 7, New Series of the Division of Entomology, pages 9 to 30 (1897), although the conclusions therein with regard to the ambrosia fungi have been somewhat modified by later researches by other investigators.

Because of their dependence upon ambrosia as food and because the ambrosia fungi require moisture for growth, the depredations of ambrosia beetles are manifested most frequently in recently-felled timber and green unseasoned lumber. The beetles in forming their galleries bore through the wood and thereby decrease its strength and prevent its use for certain purposes, whereas the ambrosia fungi leave stains which detract from the appearance and usefulness of the wood. Ambrosia beetle attack represents a loss of considerable magnitude to the lumber industry, particularly that of the Southern States where ambrosia beetles are widely distributed and their attacks are of great intensity. Ambrosia beetles attack all green woods and their flight period in the Southern States extends approximately from March 15 to November 1.

In view of the unique life habits of ambrosia beetles, methods for controlling them have been especially unsatisfactory. In general it may be said that toxic insecticides applied to the bark of trees or logs or applied to surface of green unseasoned lumber provide no control since the insect can bore through the toxic coating and the superficial layers of the tree or log and establish a colony in the interior of the wood. Fungicides applied to the bark of trees or logs or to green wood surfaces are also of substantially no benefit since the ambrosia fungus, without which the insect cannot live, is grown below the surface of the wood. F. C. Craighead (U. S. Department of Agriculture Bulletin No. 1079, August, 1922) found that wood which had been submerged in a solution of sodium arsenate for 48 hours and then dried was attacked by ambrosia beetles and that the poison did not deter or injure the beetles. Impregnation of the log with a toxic material to considerable depth beneath the surface might impede the growth of the ambrosia fungus but would be of little protective value against the insect since the insect does not utilize the wood as food. However, even if impregnation treatments were found to be effective, they are expensive and their use is not practicable. The greatest damage from ambrosia beetles is occasioned before the timber reaches the mill, that is, while the felled timber is awaiting transportation to the mill. The only possible treatment which could be economically applied to the logs in the field is a simple coating or spraying operation.

Treatments or remedies which have been heretofore recommended for the control of ambrosia beetles include coating the logs with creosote or kerosene. These have been found to be insufficiently effective. In Bulletin No. 1079 of the U. S. Department of Agriculture (August, 1922)

F. C. Craighead disclosed experiments with spray solutions for preventing insect injury to green logs, among which were detailed some experiments on controlling ambrosia beetle attack with various materials, including a mixture of kerosene and creosote oil, a mixture of pyridine and kerosene, and a solution of corrosive sublimate; the latter was the least effective. In U. S. Patent 2,164,328, granted to Harold R. Hay, are disclosed tests with various other compounds, solutions of which were sprayed on green logs. In these tests diphenyl and diphenyl-benzenes ("triphenyls") were found to be the best ambrosia beetle repellents and logs treated with cresylic acid, trichlorobenzene, chlorinated diphenyls (42% and 54% combined chlorine content) and benzyl phenol were more attacked than untreated logs whereas beta-naphthol, ortho-dichlorobenzene, para-dichlorobenzene and cyclohexylamine gave some degree of control but not of the same order as that observed with diphenyl. The control of ambrosia beetle is a rather specific problem and toxicities of an insecticidal or fungicidal material are of little value in predicting effectiveness of a material as a control medium for these insects.

The principal objects of the present invention are to provide a simple method of controlling ambrosia beetle attack on green lumber by a simple coating or spraying operation with a repellent material that is of low cost, which material is highly repellent to ambrosia beetles, is free from odors objectionable to man, and is non-toxic to higher forms of animal life, which leaves a relatively permanent coating upon application to wood, which coating is not substantially affected by weathering, does not stain or decompose wood to which it is applied or affect varnishes or paints which are subsequently applied to the wood, and whose use is not attended with any substantial fire hazard. Other objects will be apparent from the description hereinafter.

I have found that these objects are admirably realized by coating or spraying the green logs or lumber that is being dried or seasoned with a solution of an alkylated alkylene polyamine such as is described in my copending application, Serial No. 222,115, filed July 30, 1938, or a salt thereof. Wood thus coated with these materials remains resistant to attack from ambrosia beetles and fungi associated therewith for long periods, and is not adversely stained or otherwise affected by the coating. The coating, furthermore, is not substantially affected by rain and weathering.

The alkylated alkylene polyamines disclosed in my copending application, Serial No. 222,115, filed July 30, 1938, have at least one alkyl group which contains from 6 to 20 carbon atoms joined to one of the amino nitrogen groups and have one, two, three or four alkylene groups interconnected by nitrogen atoms. They may be represented structurally in their simpler form as follows:

X—NH—R—(NH—R)$_n$—NH—Y in which R is an alkylene radical which may be the ethylene radical (—CH$_2$CH$_2$—), the propylene radical (—CH$_2$CH(CH$_3$)—), the trimethylene radical (—CH$_2$CH$_2$CH$_2$—) or a mixture of such radicals and $n$ may be 0, in which case the bracketed group is nonexistent or $n$ may be a whole number from 1 to 3; and X is hydrogen or an alkyl radical which may range from methyl to eicosyl (C$_{20}$H$_{41}$—) and Y is an alkyl group having from 8 to 20 carbon atoms. Both X and Y may preferably be the normal (straight chain) alkyl groups; however, forked or branched chain alkyl groups may be employed. The amines may be used as free bases and also in the form of salts with hydrochloric acid, sulfuric acid, acetic acid, etc.

Examples of specific compounds whose use is contemplated herein are N-octyl ethylene diamine, N-2-ethylhexyl ethylene diamine, N-decyl ethylene diamine, N-tetradecyl ethylene diamine, N,N'-dibutyl ethylene diamine, N,N'-didodecyl ethylene diamine, N-butyl-N'-decyl ethylene diamine, N-dodecyl diethylene triamine, N-tetradecyl diethylene triamine, N-hexadecyl triethylene tetramine, N-tetradecyl trimethylene diamine, N-tetradecyl propylene diamine. Mixtures of such compounds consisting either of compounds derived from the same alkylene polyamine with different alkyl substituents, such as would result on treating ethylene diamine with mixed alkyl chlorides, or mixtures of varying degrees of alkylation or mixtures containing compounds derived from different alkylene polyamines with the same or different or mixed alkyl substituents are also contemplated for use herein.

Various methods of preparing compounds suitable for use according to this invention are known. A preferred method of preparing the compounds consists in alkylating the alkylene polyamines by means of an alkyl chloride. Long-chain alkyl chlorides may be obtained by treating alcohols with an agent such as thionyl chloride. Lauryl (n-dodecyl) chloride, for example, can be obtained by treating with thionyl chloride the lauryl alcohol fraction derived from the hydrogenation of cocoanut fatty acids. Mixtures of alcohols containing alcohols having from 10 to 16 carbon atoms consisting predominantly of even-numbered carbon-atom alcohols may be used for obtaining corresponding mixed alkyl chlorides and alkylated alkylene polyamines. These mixed alkylated alkylene polyamines are for some purposes as suitable for use in the invention as the compounds derived from a single isomer or homologue.

The alkyl chlorides can be made by other methods, for example, by means of the reaction of alcohols with dry hydrogen chloride using zinc chloride as a catalyst or by direct chlorination of paraffin hydrocarbons.

The alkylene polyamine is alkylated by heating with the alkyl chloride without pressure; superatmospheric pressure and elevated temperatures may be used advantageously.

The extent to which alkylation is conducted determines the relative amounts of mono- and poly-alkyl substitution. For my purpose I may and sometimes actually prefer to use a mixture of the mono- and poly- alkyl-substituted alkylene polyamines. Where a mono- or poly- alkyl alkylene polyamine in pure form is required it may be isolated by fractional distillation.

An example of a method of preparing a typical compound of the invention, N-n-hexadecyl triethylene tetramine, NH$_2$—C$_2$H$_4$—NH—C$_2$H$_4$—NH—
<br>C$_2$H$_4$—NH—C$_{16}$H$_{33}$ follows: A fraction of alkyl chlorides (boiling at 150° to 160° C. at a pressure of 2 to 3 mm.) obtained by reaction with thionyl chloride of the fraction of fatty alcohols derived from hydrogenation of cocoanut fatty acids having a boiling point of 180° to 185° C. at a pressure of 15 mm.

was used. This fraction of the alcohols corresponded approximately to n-hexadecyl alcohol and the alkyl chloride formed was substantially pure n-hexadecyl chloride. One mol of this hexadecyl chloride was heated at about 150° C. with about five mols of triethylene tetramine for about 5 hours. The reaction mixture, on cooling, separates into two layers. The upper layer contains the desired reaction product and is distilled under vacuum to separate the unreacted triethylene tetramine. The resulting hexadecyl triethylene tetramine was purified by distillation under vacuum. Its boiling point is approximately 230° to 250° C. at a pressure of 2 to 3 mm. and it is a viscous oil which dissolves in water with a most persistent foam.

In a similar manner other N-alkylated alkylene polyamines may be prepared from corresponding alkylene polyamines and alkyl chlorides. The boiling points of several of these substantially pure N-alkylated alkylene polyamines prepared in this manner are as follows:

| | Boiling point |
|---|---|
| N-n-octyl ethylene diamine | 118°–121° C./10 mm. |
| N-2-ethylhexyl ethylene diamine | 108°–110° C./12 mm. |
| N-n-decyl ethylene diamine | 140°–145° C./9 mm. |
| N-n-tetradecyl ethylene diamine | 187°–191° C./9 mm. |
| N,N'-di-(n-butyl) ethylene diamine | 110°–115° C./15 mm. |
| N-n-dodecyl diethylene triamine | 204°–206° C./8 mm. |
| N-n-tetradecyl diethylene triamine | 190°–197° C./2 mm. |

In preparing repellents from the alkylated alkylene polyamines it is not necessary to use individual pure compounds. Crude reaction mixtures are in most cases equally as effective against ambrosia beetles. Such a crude reaction mixture is that prepared by alkylating ethylene diamine, diethylene triamine or triethylene tetramine with the mixture of alkyl chlorides prepared from the higher fatty alcohols known as "Lorol," consisting of alcohols having from approximately 10 to 16 carbon atoms in the molecule, predominantly those having an even number of carbon atoms. The mixture of alkylated alkylene polyamines which results may contain both mono- and dialkylated compounds. A mixture consisting of purified "decyl to tetradecyl" diethylene triamine containing only mono-alkylated compounds resulting from alkylation with a mixture of alkyl chlorides containing from 10 to 14 carbon atoms in the molecule prepared from the fraction of "Lorol" consisting of alcohols containing from 10 to 14 carbon atoms has a boiling range of 150° to 200° C. at a pressure of 5 mm.

These compounds and solutions containing them are referred to herein as ambrosia-beetle repellents or ambrosiacides. Whether their action is attributable to their taste, their odor or their toxicity to fungi or to the insects or to a combination of all these properties has not been ascertained. The terms ambrosia-beetle repellent and ambrosiacide are therefore not to be understood to refer to any particular killing or repelling action of the material but are to be construed as referring broadly to any action upon ambrosia beetles or the fungi associated therewith whereby the materials treated with the compound are rendered undesirable as a habitation or rendered destructive to the insects or their fungi and attack by the beetles or fungi associated therewith is thereby prevented.

The compounds described herein are for the most part liquid or solid materials which are applied most conveniently to the timber or lumber in the form of a solution in a suitable solvent. A relatively large number of solvents are available, but preference is given to those low-cost liquids such as gasoline, kerosene, heavier petroleum oils of the lubricating or fuel-oil range, benzene, toluene, petroleum ether, alcohol, etc. In some cases where readily volatile solvents (gasoline or benzene) are employed it is also desirable to incorporate a relatively non-volatile resin or wax, such as rosin, ester gum or paraffin wax, in an amount approximately equal to that of the repellent compound, into the solvent for the purpose of preventing unduly rapid evaporation with resultant blooming or deposition of fluffy crystals of the repellent upon the surface of the treated material. Fluffy deposits are easily disengaged by friction, wind and rain, hence a waxy coating is preferred.

For preventing attack of ambrosia beetles upon green logs or lumber the repellent compound may be employed in various concentrations. The greater the concentration of the solution, the heavier is the deposit left on the treated material and hence the more protected is the tested material. The concentration to use will be dependent to a considerable extent upon the method of application and the quantity of solution left on the surface of the treated material. Generally, solutions containing from 5% to 35% are sufficiently concentrated and will provide with a single dipping, spraying or brushing application of the solution a coating that is resistant to attack by ambrosia beetles for long periods.

In applying the solutions, either dipping, spraying, or brushing may be used. In the case of green logs it should be applied over the bark; the ends of the logs should also be coated in order to prevent the entrance of beetles parallel to the grain of the wood. Lumber may be treated at the mill after it is cut, preferably by a dipping operation, or it may be treated while in stacks by spraying.

Ambrosia beetles are most destructive to freshly cut logs or to lumber prepared therefrom. After the surface of the wood has become dry, usually within twenty or thirty days in the case of cut lumber, it becomes comparatively immune from attacks of ambrosia beetles, therefore the permanence of the coating after this period is not a critical consideration.

The repellent compounds of the invention may be used together with known insecticidal or fungicidal materials. Thus, a solution may be prepared to provide protection not only against ambrosia beetles but to prevent attack by other insects and to provide prolonged protection from fungi. As an example of a composition that may be applied to fresh-cut lumber to provide prolonged protection from termites and sap-stain fungi and to provide protection from ambrosia beetles, I have used a solution consisting of 5 parts of pentachlorophenol, 5 parts of dodecyl diethylene triamine and 5 parts of ester gum (to prevent blooming) dissolved in 100 parts of petroleum solvent of the fuel oil boiling range. This composition is preferably applied by dipping so as to secure adequate penetration of the toxic materials.

To illustrate the efficacy of the ambrosiacides of my invention the results of a series of tests in which one of these ambrosiacides was compared with other materials are shown in the table below. In these tests a series of strips of sap gum wood approximately 1¼ inches x 4 inches x 12 inches were dipped into the solutions indicated and the solution was allowed to drain from the pieces. These strips of wood were then placed in a cage in which were contained pieces of sap wood heavily infested with ambrosia beetles and the progress of the attack of the test pieces by the ambrosia beetles and the progress of the attack by sap-staining fungi were noted periodically. The growth of the fungi was observed by appearances and recorded as light, heavy or medium. The attack by the ambrosia beetles was observed by counting the number of holes found in the test pieces and was recorded as unattacked, light, medium or heavy. A light attack was considered as 1 to 10 holes in the test piece, a medium attack as one resulting from the presence of 11 to 30 holes in the test piece and the attack was designated as heavy if more than 30 holes were found in the test piece. The test was relatively severe inasmuch as it represents extreme conditions which probably would not actually be found in practice. The progress of the attacks after the indicated number of days were as follows:

| Composition tested | Period | Ambrosia beetle attack | Blue stain fungus attack |
|---|---|---|---|
| | Days | | |
| Dodecyl diethylene triamine 5% in kerosene 95%. | 18 | Unattacked. | Light. |
| Trichlorobenzene 100% | 37 | Medium | Medium |
| Hexachlorobenzene 23% and kerosene 77%. | 33 | Heavy | Heavy. |
| Chlorinated diphenyl (42% chlorine) 20% and kerosene 80%. | 33 | ...do | Do. |
| Pentachlorophenol 5%, fuel oil 90% and ester gum 5%. | 37 | ...do | Light. |
| N-amyl-N-benzyl cyclohexylamine 15% and kerosene 85%. | 18 | ...do | Medium |
| Benzene 100% | 18 | ...do | Do. |
| Toluene 100% | 37 | ...do | Heavy. |
| Kerosene 100% | 37 | ...do | Medium |
| Control | 13 | ...do | Heavy. |

Although the repellent compound is applied preferably in solution as described hereinabove it may also be applied, if desired, in the form of a suspension or emulsion which can be prepared in usual manners with water. In either case, the use of agglutinants, to insure the adherence of the repellent compound to the wood, as is well understood by those skilled in the art, may be desirable. The alkylated alkylene polyamines of themselves are excellent emulsifying agents, as disclosed herein and in my copending application, Serial No. 122,115, filed July 30, 1938, and an emulsion of great stability may be prepared by dissolving the alkylated alkylene polyamine in an oil such as white mineral oil and thereafter emulsify the oil solution in water. The application of the repellent compounds in the liquid or molten condition may be resorted to for the application of heavy coatings.

Although I have shown and described the preferred forms of the invention it will be apparent that numerous modifications may be made therein without departing from its scope, as defined in the appended claims.

What I claim is:

1. A repellent for ambrosia beetles comprising an N-alkylated alkylene polyamine of the general formula

X—NH—R—(NH—R)$_n$—NH—X or a salt thereof, in which R is an alkylene radical selected from the group consisting of ethylene, trimethylene and proylene radicals, X is selected from the group consisting of hydrogen and alkyl radicals having less than 21 carbon atoms, at least one of which is an alkyl radical having more than 7 carbon atoms, and $n$ is a number from 0 to 2.

2. A repellent for ambrosia beetles comprising an N-alkylated alkylene polyamine selected from the group consisting of N-alkylated ethylene diamines, propylene diamines, trimethylene diamines, diethylene triamines, dipropylene triamines, triethylene tetramines and tripropylene tetramines in which at least one of the alkyl groups contains more than 7 and less than 21 carbon atoms.

3. A repellent for ambrosia beetles comprising an N-dodecyl ethylene diamine.

4. A repellent for ambrosia beetles comprising an N-n-tetradecyl diethylene triamine.

5. A repellent for ambrosia beetles comprising an N-n-dodecyl diethylene triamine.

6. A repellent for ambrosia beetles comprising a mixture of N-alkylated alkylene polyamines in which the alkyl groups have from 10 to 16 carbon atoms.

7. The method of protecting green logs and green lumber from attack by ambrosia beetles which comprises applying to said logs and lumber a repellent comprising an N-alkylated alkylene polyamine of the general formula

X—NH—R—(NH—R)$_n$—NH—X or a salt thereof, in which R is an alkylene radical selected from the group consisting of ethylene, trimethylene and propylene radicals, X is selected from the group consisting of hydrogen and alkyl radicals having less than 21 carbon atoms, at least one of which is an alkyl radical having more than 7 carbon atoms, and $n$ is a number from 0 to 2.

8. The method of protecting green logs and green lumber from attack by ambrosia beetles which comprises applying to said logs and lumber a repellent comprising an N-alkylated alkylene polyamine selected from the group consisting of N-alkylated ethylene diamines, propylene diamines, trimethylene diamines, diethylene triamines, dipropylene triamines, triethylene tetramines and tripropylene tetramines in which at least one of the alkyl groups contains more than 7 and less than 21 carbon atoms.

9. The method of protecting green logs and green lumber from attack by ambrosia beetles which comprises applying to said logs and lumber a repellent comprising an N-dodecyl ethylene diamine.

10. The method of protecting green logs and green lumber from attack by ambrosia beetles which comprises applying to said logs and lumber a repellent comprising an N-n-tetradecyl diethylene triamine.

11. The method of protecting green logs and green lumber from attack by ambrosia beetles which comprises applying to said logs and lumber a repellent comprising an N-n-dodecyl diethylene triamine.

12. The method of protecting green logs and green lumber from attack by ambrosia beetles which comprises applying to said logs and lumber a repellent comprising a mixture of N-alkylated alkylene polyamines in which the alkyl groups have from 10 to 16 carbon atoms.

LUCAS P. KYRIDES.

CERTIFICATE OF CORRECTION.

Patent No. 2,244,712.  June 10, 1941.

LUCAS P. KYRIDES.

It is hereby certified that error appears in the printed specification of the above numbered patent requiring correction as follows: Page 4, first column, line 55, for the serial number "122,115" read --222,115--; same page, second column, line 2, claim 1, for "proylene" read --propylene--; and that the said Letters Patent should be read with this correction therein that the same may conform to the record of the case in the Patent Office.

Signed and sealed this 5th day of August, A. D. 1941.

(Seal)

Henry Van Arsdale,
Acting Commissioner of Patents.